UNITED STATES PATENT OFFICE.

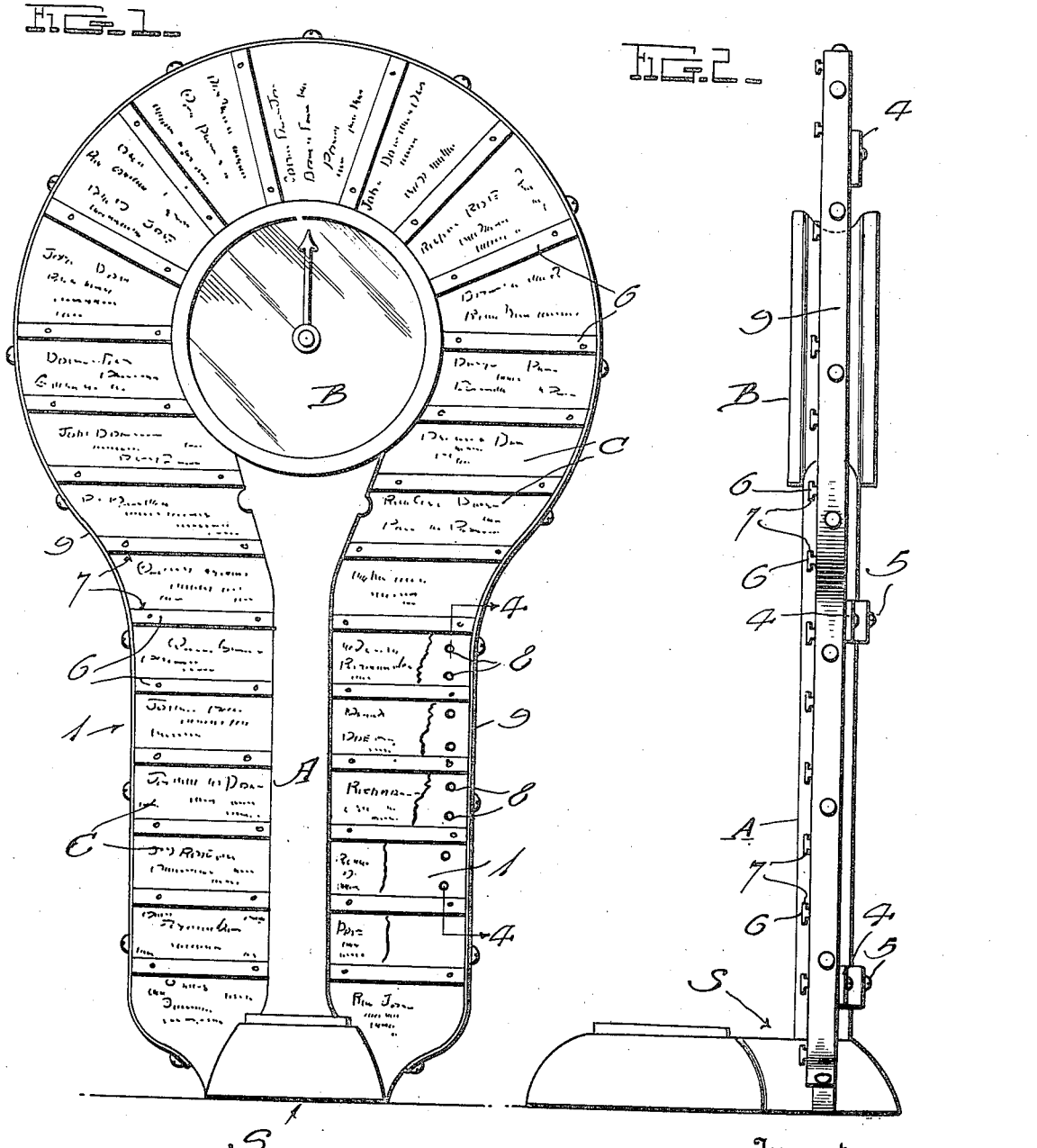

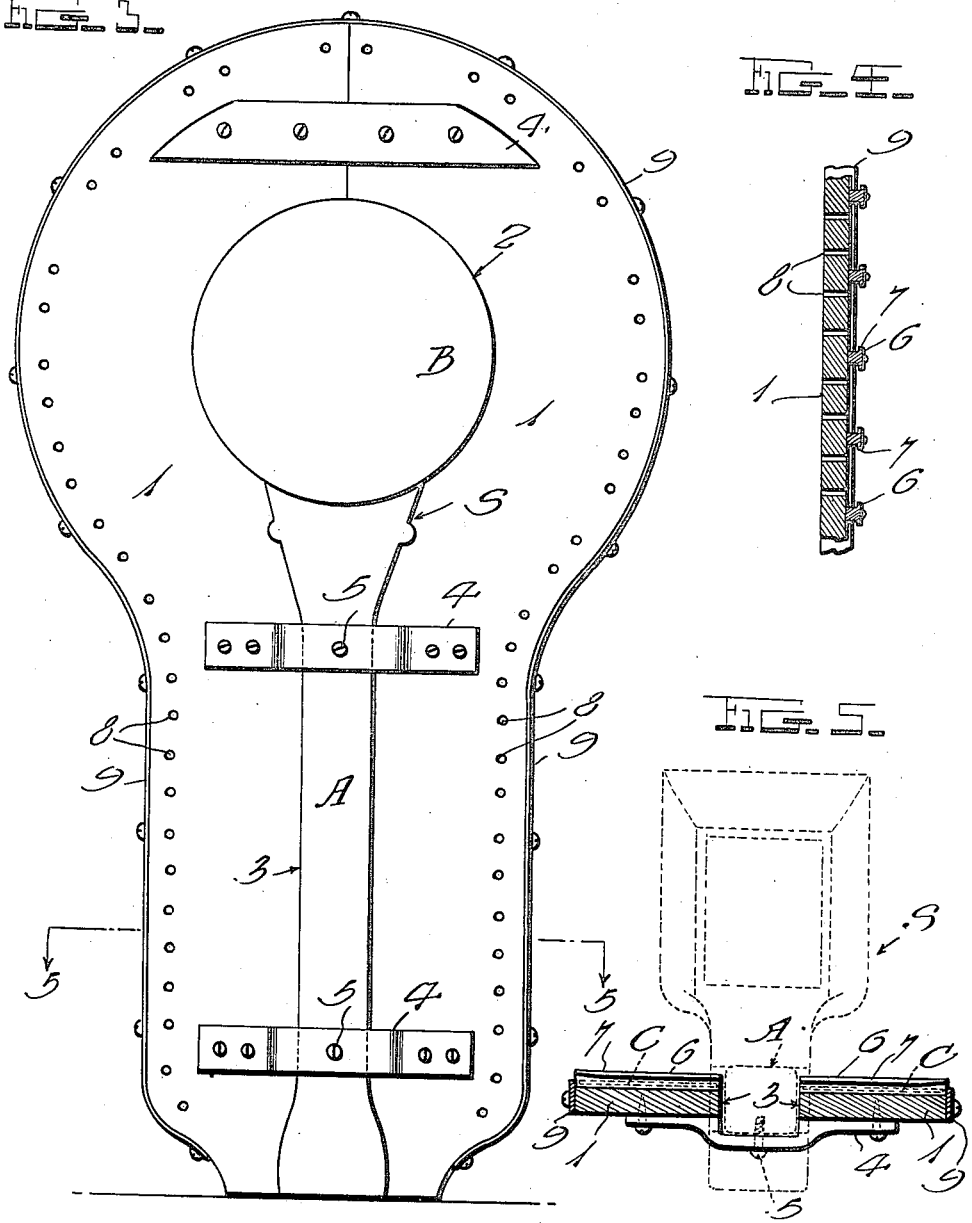
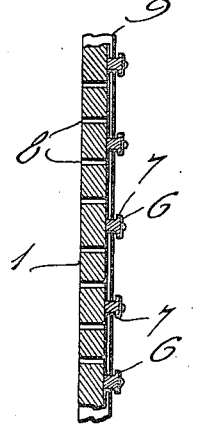
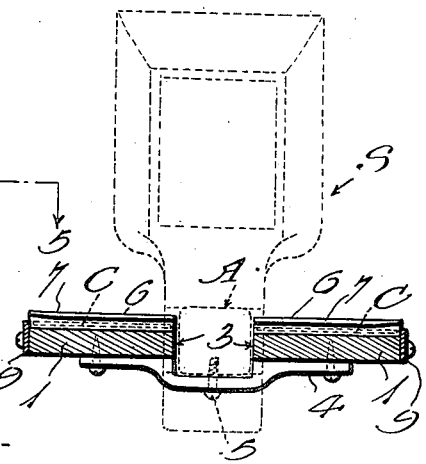

KENNETH GRAY FISHER, OF TACOMA, WASHINGTON.

WEIGHING-SCALE ATTACHMENT.

1,425,465. Specification of Letters Patent. Patented Aug. 8, 1922.

Application filed November 15, 1920. Serial No. 424,240.

*To all whom it may concern:*

Be it known that I, KENNETH GRAY FISHER, a citizen of the United States, residing at Tacoma, in the county of Pierce and State of Washington, have invented certain new and useful Improvements in Weighing-Scale Attachments; and I do declare the following to be a full, clear, and exact description of the invention, such as will enable others skilled in the art to which it appertains to make and use the same.

This invention relates to an improved attachment which is especially designed to be used in connection with public weighing scales such as are generally placed in front of grocery stores and other places of business.

The principal object of the invention is to provide an attachment of the above class in the form of a signboard, the same being provided with an opening for reception of the indicator head of the scale, and being further provided with a slot extending from this opening for reception of the standard of the scale.

A further object of the invention is to provide an attachment of this class which is extremely simple in construction, and one wherein the card holding means is such that the card containing the advertisement may be easily and readily placed in position or removed.

Another object of the invention is to provide an attachment of this class which is very inexpensive, and which, when in use, adds to the attractiveness of the scale.

Other objects and advantages of the invention will be apparent in the course of the following description.

In the accompanying drawings forming a part of this specification and in which like numerals are employed to designate like parts throughout the same:

Figure 1 is a front elevation of a conventional weighing scale with my attachment in position.

Figure 2 is a side or edge view of Figure 1.

Figure 3 is a rear elevational view thereof.

Figure 4 is a detail section taken on the plane of the line 4—4 of Figure 1.

Figure 5 is a horizontal section taken on the line 5—5 of Figure 3, looking in the direction of the arrows.

Referring to the drawings, wherein the preferred embodiment of this invention is clearly illustrated, it will be seen that the letter S designates a conventional type of weighing scale such as is seen in front of business houses, the same, including a standard A at the upper end of which is the usual indicator head B.

As before intimated, my attachment is in the form of a sign-board which is preferably constructed from two symmetrical half-sections or members 1, each of which has its inner edge shaped to correspond to the contour of the portion of the scale on which the attachment is placed. The sections 1 when brought together in the manner illustrated provide an opening 2 for reception of the head B and they further provide an elongated open ended slot 3 for reception of the standard A. The shape of this opening and slot will vary according to the shape of the scale on which the attachment is to be placed. The outer edges of the members 1 may be shaped in any way so long as they impart an attractive and neat appearance to the device. Suitable brackets 4 serve to connect the sections 1 snugly around the scale. In practical use, the standard of this scale will be tapped to provide a screw-threaded opening, and set-screws 5 or the like will be carried by the brackets for reception in these openings.

Any suitable means may be employed for the purpose of retaining the advertising cards C in position on the front face of the sections 1. I prefer to employ a plurality of short strips or ribs 6 and secure these at spaced intervals on the front faces of these sections, thus producing a plurality of spaces into which the cards may be slid. At this point, I wish to mention that careful consideration of the exact construction of these ribs will disclose the fact that the longitudinal edges of each one are undercut to provide shoulders 7. This structure is employed because of the fact that it facilitates in removing the advertising card. It is also to be noted that the sections 1 are provided near their outer edges, with a plurality of openings 8, and these openings serve to permit a pin or other similar element to be passed through them and against the back of the card, whereby the latter may be pushed from beneath the shoulders and easily and readily removed.

Metal reinforcing bands are secured around the outer edges of each of the sections 1 and these bands are of the width to extend slightly beyond the front faces of the section. In addition to serving as reinforcing bands, they also serve as a novel means for preventing endwise displacement of the cards from between the ribs on the sections.

In order to make use of the attachment, the sections 1 are arranged around the edges of the standard and head in the manner disclosed, and they are clamped tightly against the edges by means of the brackets 4. Then the set-screws which these brackets carry, are turned into the screw-threaded openings in the standard, and the device is then held securely in place. The cards containing the desired advertisements are then placed between the strips or ribs and allowed to drop behind the projecting portion of the aforesaid reinforcing bands 9. Now, when it is desired to remove any of these cards and replace them it is only necessary to take a pin or other similar device, pass it through the one of the openings 8 against the rear sides of the cards and force the latter from beneath the shoulders 7. By so moving the cards, they are permitted to clear the projecting portion of the bands 9, and they can then be easily slid out from between said ribs.

An attachment of the type set forth will be found extremely advantageous in that it will serve as a novel advertising means for business houses. For instance, if it is placed in front of a grocery store, the articles on sale within the store may conveniently and advantageously be advertised. Inasmuch as this attachment is extremely simple in construction, it may be manufactured and sold at an extremely low cost. Should it be desired, pieces of glass may be inserted between the ribs to prevent the cards from being removed and to add to the attractiveness of the device. These and other objects and advantages of the invention have, no doubt, become apparent from the foregoing description and drawings.

A careful consideration of the foregoing description taken in connection with the accompanying drawings should be sufficient to enable persons skilled in the art to which this invention relates to obtain a clear understanding of the same, therefore, a more lengthy description is deemed unnecessary.

Since probably the best results may be obtained by the construction and arrangement herein shown and described, this construction and arrangement is taken as the preferred embodiment of my invention. However, I wish it to be understood that the various minor changes in the shape, size, and arrangement of parts may be resorted to without departing from the spirit of the invention, or the scope of the adjoined claims.

I claim:

1. A device of the class described comprising a sign-board for attachment to a public weighing scale, said board comprising a pair of symmetrical half-sections having their inner edges shaped to fit snugly against the edges of the scale, brackets for retaining said sections together, and means carried by said brackets for retaining the sections in position on the scale.

2. A device of the class described comprising a sign-board for attachment to a public weighing scale, said board being made up of two symmetrical sections having their inner edges shaped to fit snugly against the adjacent sides of the scale, brackets secured to the rear sides of said sections for connecting the latter together, fastenings carried by said brackets for securing the latter and said sections to the scale, strips secured to the front faces of said sections at spaced intervals to provide a number of card receiving spaces, said strips having their opposite longitudinal edges undercut to provide shoulder beneath which the cards are designed to extend, a reinforcing band secured to the outer peripheral edges of said sections, said band being of a width to project beyond the front faces of the sections so as to provide stops for preventing accidental endwise displacement of the cards from the card receiving spaces, said sections being provided at points between the aforesaid strips with holes through which a suitable instrument may be passed for moving the cards to a position where they will clear the projecting edges of said bands.

In testimony whereof I have hereunto set my hand.

KENNETH GRAY FISHER.